(12) United States Patent
Manav

(10) Patent No.: US 10,637,981 B2
(45) Date of Patent: *Apr. 28, 2020

(54) COMMUNICATION BETWEEN USERS OF A TELEPHONE SYSTEM

(71) Applicant: Unify GmbH & Co. KG, Munich (DE)

(72) Inventor: Cansu Manav, Cankaya (TR)

(73) Assignee: UNIFY GMBH & CO. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/192,039

(22) Filed: Nov. 15, 2018

(65) Prior Publication Data

US 2019/0089824 A1 Mar. 21, 2019

Related U.S. Application Data

(63) Continuation of application No. 15/040,200, filed on Feb. 10, 2016, now Pat. No. 10,165,100, which is a continuation of application No. 14/256,082, filed on Apr. 18, 2014, now Pat. No. 9,294,622.

(30) Foreign Application Priority Data

Apr. 19, 2013 (EP) ..................... 13002086

(51) Int. Cl.
*H04M 1/64* (2006.01)
*H04M 1/65* (2006.01)
(Continued)

(52) U.S. Cl.
CPC ......... *H04M 1/6505* (2013.01); *H04M 1/271* (2013.01); *H04M 1/652* (2013.01);
(Continued)

(58) Field of Classification Search
CPC .... H04M 1/6505; H04M 1/271; H04M 1/652; H04M 3/42042; H04M 3/4936; H04M 3/563; H04M 3/42093; H04M 2203/308
See application file for complete search history.

(56) References Cited

U.S. PATENT DOCUMENTS 5,161,199 A * 11/1992 David ................. G11C 7/16
434/167
7,076,031 B1 7/2006 Bress et al.
(Continued)

FOREIGN PATENT DOCUMENTS

EP 2046009 A1 4/2009

*Primary Examiner* — Solomon G Bezuayehu
(74) *Attorney, Agent, or Firm* — Buchanan Ingersoll & Rooney PC

(57) ABSTRACT

Each user of a telecommunications system may speak and record their own name, in their own voice, and a recording of their spoken name may subsequently be accessed by or delivered to other users of the system, thereby facilitating communication between users by enabling users to better know how to pronounce the names of other users. A user may listen to the recorded spoken name of another user before placing a call to another user. When a user joins a conference call, their spoken name may be announced to other users (attendees) already in the call. A user joining a conference call may listen to the recorded spoken names of attendees in the call. A button on users' phones may invoke these features.

20 Claims, 1 Drawing Sheet

(51) Int. Cl.
*H04M 3/42* (2006.01)
*H04M 3/493* (2006.01)
*H04M 3/56* (2006.01)
*H04M 1/27* (2006.01)
*H04M 1/652* (2006.01)
*H04M 3/487* (2006.01)

(52) U.S. Cl.
CPC ... *H04M 3/42042* (2013.01); *H04M 3/42093* (2013.01); *H04M 3/4936* (2013.01); *H04M 3/563* (2013.01); *H04M 3/4872* (2013.01); *H04M 2203/308* (2013.01); *H04M 2203/5081* (2013.01); *H04M 2203/654* (2013.01)

(56) References Cited

U.S. PATENT DOCUMENTS

| | | | |
|---|---|---|---|
| 2005/0036640 A1* | 2/2005 | Goldenberg | A63H 5/00 381/334 |
| 2005/0181726 A1* | 8/2005 | Gottlieb | H04M 1/72519 455/41.2 |
| 2005/0286687 A1 | 12/2005 | Sanmugasuntharam et al. | |
| 2006/0067499 A1 | 3/2006 | Oliveira et al. | |
| 2008/0101557 A1 | 5/2008 | Boss et al. | |
| 2008/0192905 A1 | 8/2008 | Fujita-Yuhas | |
| 2009/0171486 A1* | 7/2009 | Lindsay, Jr. | G11B 25/00 700/94 |
| 2009/0190728 A1 | 7/2009 | Bushnell et al. | |
| 2009/0323911 A1* | 12/2009 | Dury | H04M 3/53333 379/88.22 |
| 2011/0078570 A1* | 3/2011 | Larsen | G06F 40/166 715/710 |
| 2011/0082705 A1* | 4/2011 | Kobylevsky | G06Q 10/10 705/2 |
| 2011/0228922 A1 | 9/2011 | Dhara et al. | |
| 2011/0250570 A1 | 10/2011 | Mack | |
| 2014/0044251 A1 | 2/2014 | Dhir et al. | |
| 2014/0136331 A1 | 5/2014 | Madhavapeddi et al. | |
| 2018/0332170 A1* | 11/2018 | Li | H04M 1/5166 |
| 2019/0089824 A1* | 3/2019 | Manav | H04M 3/42093 |

* cited by examiner

COMMUNICATION BETWEEN USERS OF A TELEPHONE SYSTEM

CROSS-REFERENCE TO RELATED APPLICATIONS

The present application is a continuation of U.S. patent application Ser. No. 15/040,200, which is a continuation of U.S. patent application Ser. No. 14/256,082, which claims priority to European Patent Application No. 13002086.0, filed Apr. 19, 2013.

FIELD OF INVENTION

The invention relates to telecommunications, more particularly to telephone systems, such as private branch exchanges (PBXs), and to databases associated with users of the system. The invention further relates to a method of improving communication between users of a telephone system and a computer program product for executing such a method and to a system implementing the method.

BACKGROUND OF THE INVENTION

A telecommunications network generally includes a collection of terminals, links and nodes which connect together to enable telecommunication between users of the terminals. Examples of telecommunications networks are: computer networks, the Internet, the telephone network, and others. Messages are generated by a sending terminal, then pass through the network of links and nodes until they arrive at the destination terminal. It is the job of the intermediate nodes to handle the messages and route them down the correct link toward their final destination. The messages consist of control (or signaling) and media parts which can be sent together or separately. The control (or signaling) part instructs the nodes where and possibly how the message should be routed through the network. The media is the actual content that the user wishes to transmit (e.g. some encoded speech, or an e-mail).

A private branch exchange (PBX) is a telephone exchange that serves a particular business or office, as opposed to one that a common carrier or telephone company operates for many businesses or for the general public. PBXs make connections among the internal telephones of a private organization—usually a business—and also connect them to the public switched telephone network (PSTN) via trunk lines.

A conference call is a telephone call in which the calling party wishes to have more than one called party listen to or participate in the Call. Conference calls can be designed so that the calling party calls the other participants and adds them to the call; however, participants may be able to call into the conference call themselves.

In the context of a telephone exchange, such as a PBX, in a typical scenario, a person making a call ("caller") may first look up the name of a person being called ("callee"), such as on a database associated with the telephone exchange. However, it may be difficult to ascertain the correct pronunciation of a colleague's (callee's) name, simply from reading their name. This can be a common problem in multinational companies, when communicating with colleagues from different nations using different languages and different dialects. In some cases, it is not even possible to realize the gender of a person just from seeing their name for the first time. Therefore, it may be awkward when calling a person for the first time, not even knowing how to address them (such as "Mr." or "Ms."), and it may take some time for the caller to understand if they are even calling the correct person.

A person answering a phone or joining in a conference call will often announce their name to others ("attendees") already in the conference call, but it may be difficult for someone hearing the name for the first time to recognize it.

Speech synthesis is the artificial production of human speech. A computer system used for this purpose is called a speech synthesizer, and can be implemented in software or hardware products. A text-to-speech (TTS) system converts normal language text into speech; other systems render symbolic linguistic representations like phonetic transcriptions into speech. Stephen Hawking is one of the most famous people using speech synthesis to communicate.

Text-to-speech (TTS) is commonly used for normal text in telecommunication, translation or navigation tools. In other words, the pronunciation functionality is already being used by online dictionaries in daily lite for most of the words. Such tools are using computer-generated simulation of human speech which can cover the normal texts. For instance, attending a conference call one might hear the title of the conference, speech synthesized, by TTS technology. However, TTS is not well adapted to synthesizing people's names, as there is a huge variety of names and there are different accents even in one language. Even if a name is read by a TTS service, it may not provide a correct pronunciation. For example; names like Michael, Frank, etc. may be written the same but pronounced differently in English and German. Generally speaking, TTS is of only very limited utility for contact names in telecommunications.

SUMMARY OF THE INVENTION

It is an object of the invention to provide techniques for improving communication between users of a telephone system (or exchange), such as but not limited to a PBX.

This object is achieved with a method, computer program product, a telephone and a telephone system which are described and claimed herein.

According to the invention, the method of improving communication between users of a telephone system comprising a database of users is characterized by storing recordings of users speaking their own names in the database and enabling other users to listen to the recordings of users' spoken names. Usually, this method is computer-implemented.

Generally speaking, each user of a telecommunications system may speak and record their own name, in their own voice, in a database (repository) of the system, and the recording of their name may subsequently be accessed by or delivered to other users of the system. Some examples of use scenarios may include, but are not limited to:

- a user ("caller") may be able to listen to the recorded name of a colleague ("callee") before initiating a call with the intended callee, such as immediately prior to (at the beginning of) placing the call to the colleague, so as to better know how to pronounce the colleague's name when first greeting the colleague on the call.
- the recorded spoken names of users already in a conference call may be previewed by a user who is entering the conference,
- when a user enters a conference call, their recorded spoken name may be announced to the other attendees of (users in) the conference call.

In all of these scenarios, users of the phone system are able to hear other user's names, pronounced correctly, before speaking with the other user(s). As well as giving the caller some advance information about the callee, the fact that the caller pronounces the callee's name correctly (or nearly correctly) when first speaking with them may make a very good "first impression" on the callee, thereby facilitating and improving communication during the call.

In contrast with simply reading a name in a directory, or hearing a synthesized TTS version thereof, the techniques disclosed herein bring a "human factor" to bear upon the communication.

Additionally, according to the invention generally, telecommunications devices (phones) used by the users of the system may be arranged (set up) to have quick access to the spoken-name recording and playing features disclosed herein, such as a button on the phone which is dedicated (assigned) to a user recording their name into the system and/or a button on the phone dedicated to a user hearing another user's name (such as the user they are about to call).

The invention may utilize some functionality of a system typically associated with message announcements in that a user records a "greeting" message (such as "you have reached . . . I am unable . . . ") in their own voice, which is played for callers when the user is not available to answer a call. In this invention, however, the user's name is only played for other users "on demand", and may precede the making of a call or entering into a conference, etc.

According to an embodiment of the invention, a user may be able to listen to another user's spoken name before initiating a call with the user. A user may be able to listen to the spoken names of other users in a conference call. The system may announce the spoken name of a user entering a conference call to other users already in the conference call. User's phones may be provided with functionality, such as a button which may be pressed, for users to record at least their spoken names. User's phones may be provided with functionality, such as a button which may be pressed, for users to listen to the spoken names of other users.

According to the invention, a telephone comprises at least one of: means for allowing a user to record their own spoken name in a database of users; and means for enabling a user to listen to the recorded spoken names of other users.

According to the invention, a telephone system comprises a switch having a controller and access to a database, and a plurality of phones capable of connecting to the switch, and is characterized by means for invoking one of more of the following functional features:
  a user recording their spoken name, in their own voice;
  a user listening to an intended callee's recorded spoken name, in their own voice;
  playing a user s recorded spoken name to other users in a conference call; and
  playing the recorded spoken names of attendees in a conference call to a user joining the call.

The means for invoking these features may comprise at least one button on each of the phones.

A computer program product for executing the inventive method as out lined above may be provided. The computer program product may be a software product comprising instructions. The computer program product may be comprised by a machine readable medium wherein the machine readable medium may be a floppy disk, a CD (compact disc), a DVD (digital versatile disc), or any other suitable digital or analogue medium.

Other objects, features and advantages of the invention disclosed herein may become apparent from the following description(s) thereof.

BRIEF DESCRIPTION OF THE DRAWINGS

Reference will be made in detail to embodiments of the disclosure, non-limiting examples of which may be illustrated in the accompanying drawing figures (FIGs.). The figures are generally in the form of diagrams. Some elements in the figures may be exaggerated, others may be omitted, for illustrative clarity. Some figures may be in the form of diagrams. Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Different "versions" or iterations of elements may be referenced by reference numerals having the same numbers (###) followed by a different letter suffix (such as "a", "b", "c", or "A", "B", "C", or the like), in which case the similar elements may be inclusively referred to by the numeric portion (###) only of the reference numeral.

DESCRIPTION OF THE PREFERRED EMBODIMENTS

Various embodiments may be described to illustrate teachings of the invention, and should be construed as illustrative rather than limiting. It should be understood that it is not intended to limit the invention to these particular embodiments. It should be understood that some individual features of various embodiments may be combined in different ways than shown, with one another.

The embodiments and aspects thereof may be described and illustrated in conjunction with systems, devices and methods which are meant to be exemplary and illustrative, not limiting in scope. Specific configurations and details may be set forth in order to provide an understanding of the invention. However it should be apparent to one skilled in the art that the invention may be practiced without some of the specific details being presented herein. Furthermore, some well-known steps or components may be described only generally, or even omitted, for the sake of illustrative clarity.

Reference herein to "one embodiment", "an embodiment", or similar formulations, may mean that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

In the following descriptions, some specific details may be set forth in order to provide an understanding of the invention disclosed herein, it should be apparent to those skilled in the art that this invention may be practiced without these specific details. Headings (typically underlined) may be provided as an aid to the reader, and should not be construed as limiting. Any dimensions and materials or processes set forth herein should be considered to be approximate and exemplary, unless otherwise indicated.

Figure 1:
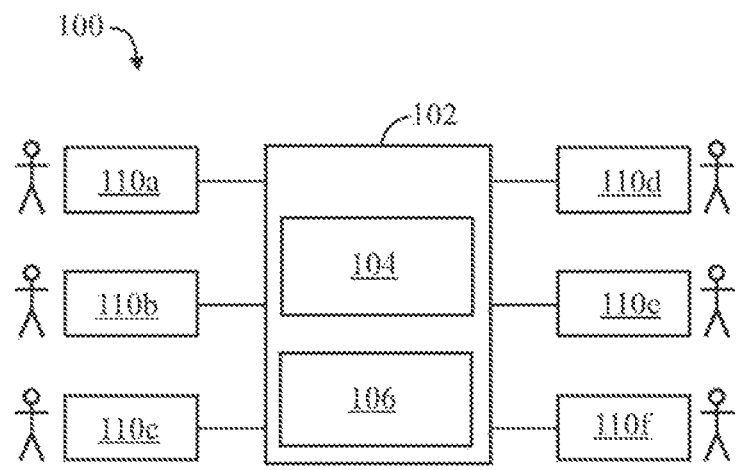
FIG. 1 is a diagram illustrating a telephone system for implementing various embodiments of the invention.

FIG. 1 shows an exemplary telephone system 100 which is suited to, or can readily be adapted to, implementing various embodiments of the invention, as may be disclosed herein. The system 100 generally comprises a "switch" 102, which has a controller 104 and a database 106. As used herein, the term "switch" may refer to any computerized telephone system, such as a private branch exchange (PBX) that may typically be used by a number of users in a given business enterprise, and may be accessible via PSTN (Public Switched Telephone Network) or VoIP (Voice over Internet Protocol), or the like. A number of telecommunications (typically desktop) devices 110 which may be referred to as "phones" may be connected in the system 100, for use by users of the system. In FIG. 1, six such phones 110a-110f are shown, and the users associated therewith (shown as stick figures, next to the phones) may be located in different parts of the world, and speak different languages or dialects.

Figure 2:
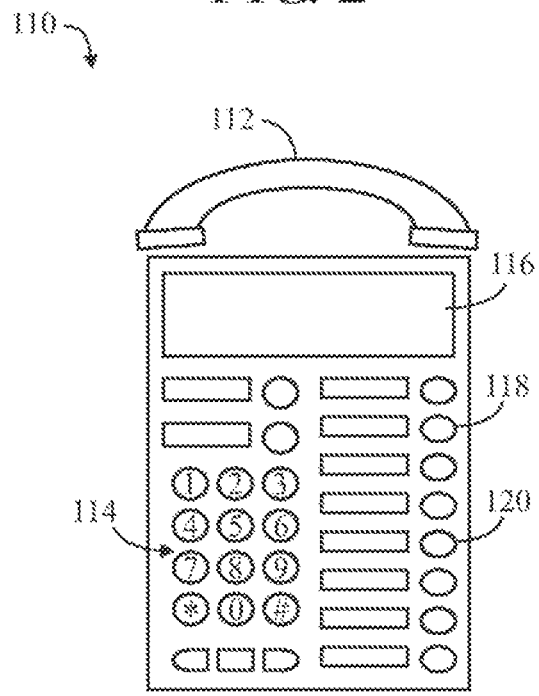
FIG. 2 is a diagram illustrating an exemplary telecommunications device (phone) for use with the system shown in FIG. 1.

FIG. 2 shows an exemplary telephone device for simply "phone") 110 which may be connected in the system 100, typically including a handset 112, a dial pad 114 (or keypad, with buttons or keys for numbers 0-9, letters, and additional characters), a display 116 (for text or images) and a number of other buttons for implementing various features such as "hold", "redial", scrolling through items being displayed on the display 116, etc. For example, a button 118 on the phone 110 may be dedicated to initiating a search of the database 106 for the phone number of an intended callee and after a user enters the first few letters of the intended callee's name (such as on the alphanumeric dial pad 114), the intended callee's number may be displayed to the user on the display 116. The user may then initiate a call to the intended callee at the touch of another button (or first having scrolled through a list of partial matches, if necessary).

According to an aspect of the invention, at least one button 120 on the phone 110 may be dedicated to the spoken name recording and playing techniques disclosed herein. For example, when a user presses the button 120, they will be able to record their spoken name, in their own voice, into the database 106. Or, when the user has located (such as displayed on the display 116) the name and/or number of an intended callee, pressing the button 120 will play the intended callee's recorded (by the intended callee, in their own voice) spoken name prior to the user initiating the call with the intended callee. Or, when a user is joining a conference call, pressing the button 120 will announce the user to the conference call by playing the user's recorded (in their own voice) spoken name (and, optionally, with associated text such as "<user> is entering the conference"). Or, when a user is joining a conference call, pressing the button 120 will play for the user joining the conference the names of users already in the conference call, in their own voices (and, optionally, with associated text such as "the following people <user1>, <user2>, <user3> are in the conference"). More than one button may lie used to invoke these various functions. The system 100 may provide for some or all of these functions, and may provide for additional functions relating to users hearing other users' spoken names.

A single button 120 may invoke more than one function (such as recording or playing back, announcing into a conference, hearing who is in the conference), such as by initiating the system 100 to announce various options to the user which may then be selected by the user pressing a key on the keypad 114, for example "press '1' to record your name, press '2' to hear the name of the user you are dialing, press '3' to announce yourself in a conference, press '4' to hear the names of attendees already in the conference", and the like.

It is within the scope of the invention that the system 100 automatically invokes some of the functions described herein, or other additional features. For example, the system 100 may recognize when a given user ("caller") is calling an intended callee for the first time (such as based on call records for user), and automatically pause (briefly) initiating the call and play the recorded name of the intended calico to the caller before making the call connection. The system 100 can automatically announce the entry of a user to other users already in a conference call. The system 100 can automatically play the names of attendees in a conference call to a user who is joining the conference call. If the users record their name directly into the switch 102, then a mechanism used in Automatic Call Distribution (ACD) Music Recorder feature can be applied to the system 100 which may also be called a "pronunciation helper" (PH). Another option is that each colleague can save their names into a third party tool such as an internal employee portal working integrated with outlook records, or they can use directly their voice contacts if defined already on their network. In this case, there will be a need of a web service that will integrate these name databases to the switch 102.

When a user records their spoken name into the system, they may of course speak additional words into the system. For example, the user may utter a friendly and informative greeting such as "hello, my name is <user's name>, I am <job description> at department or division of a company>". In a "social network" system, additional informative, introductory text could be recorded by the users.

In the manner described herein, the button(s) 120 invoking the functionality, in combination with the controller 104 and the database 106, may be considered to constitute at least one of:

means for allowing a user to record their own spoken name in a database of users; and means for enabling a user to listen to the recorded spoken names of other users (including listening to the name of an intended callee, announcing one's self into a conference call, hearing the spoken names of attendees in the conference call, etc.).

Some extensions and/or variations of the techniques described above may include, but are not limited to:

the button 120 can also be used for voice speed dial functionality. After a user pushes the button 120 (and selects from a list of options, if necessary), the user may speak the name of the intended callee (destination party) into the handset 112, and the system 100 may check its database 106, match the pronunciation of the name, and start the call. If more than one match is found, the results may be presented to the user on the display 116, whereupon the user may select the appropriate destination party.

the database (106) may be located remotely from the system, and accessible via a web service.

While the invention has been described in connection with "conventional" desktop phones having buttons, it is clear that the invention can also be applied to smartphones or other devices having e.g. a touch-screen with only "virtual" buttons. A further alternative is that voice commands may be used instead of using buttons or touch-screens for activating the recording and playing back of the respective names.

As an example for private automatic switching systems e.g. the Communication System HiPath 4000 in Siemens EC), there may be a new key type—which may be called "spelled name"—in the key layout of the phone which may be any phone (IP/TDM) with configurable name keys on it. When the user configures one key to this function, the pronounced name (in the same way as in the display name of the configured station) may be recorded on the phone. This record will then be written into the switch operating system with the switch programming language. Additionally, call processing is needed to save the "recorded voice" file on the switch. As this data is kept on the switch database, it will be possible to integrate with voicemail applications, unified communications desktop client and other management tools like OS desktop phone manager, etc.

While the invention has been described with respect to a limited number of embodiments, these should not be construed as limitations on the scope of the invention, but rather as examples of some of the embodiments. Those skilled in the art may envision other possible variations, modifications, and implementations that are also within the scope of the invention, based on the disclosure(s) set forth herein.

What is claimed is:

1. A telephone comprising:
   a display, a microphone and a speaker, the telephone being connectable to a database having recorded spoken names of users, each recorded spoken name having been spoken by the user having that name; and
   the telephone also comprising a mechanism that is configured to record a user's own spoken name for saving in the database and also actuate outputting of at least one recorded spoken name from the database prior to a call to at least one communication device being initiated;
   wherein the mechanism comprises a first button and the mechanism is configured so that actuation of the first button causes the speaker to output a recorded spoken name of a user identified by indicia displayed on the display, the recorded spoken name of the user identified by the displayed indicia being stored in the database, the recorded spoken name of the user identified by the indicia displayed on the display being a recording of the user identified by the indicia displayed on the display speaking his or her name; and
   the first button is also configured so that actuation of the first button causes the telephone to record a spoken name of a user speaking via the microphone and subsequently store that recording in the database.

2. The telephone of claim 1, wherein the mechanism is also configured so that actuation of the mechanism initiates outputting of at least one recorded spoken name stored in the database during a conference call.

3. The telephone of claim 1, wherein the first button of the mechanism is a single button such that the mechanism only has the single first button.

4. A communication system comprising:
   a switch having a controller, the switch also having access to a database, the database having a voice recording of a name of a first user, the recorded name of the first user being a recording of the first user speaking the name of the first user;
   a first telephone connectable to the switch; and
   the first telephone having a first button that is actuatable to enable a second user of that telephone to listen to a recorded spoken name of the first user stored in the database,
   wherein the first button is also actuatable to enable the second user to record the second user speaking the second user's name to store that recording in the database.

5. The communication system of claim 4, wherein the system is configured such that the first user's recorded spoken name is played when the first user joins a conference call.

6. The communication system of claim 5, wherein the first button is actuatable to enable the second user to listen to the recorded spoken name of the first user stored in the database when a display displays indicia identifying the first user at a time the first button is actuated.

7. The communication system of claim 4, wherein the first button is a single button of a mechanism of the first telephone that is configured to record a user's own spoken name for saving in the database and also actuate outputting of at least one recorded spoken name from the database prior to a call to at least one communication device being initiated.

8. The communication system of claim 5, wherein the system is configured such that actuation of the first button during a conference call causes an outputting of at least one recorded spoken name in the database and wherein the first button is configured so that actuation of the first button prior to a call being made results in outputting of the recorded spoken name of the first user stored in the database when indicia is displayed on a display of the first telephone having the first button being actuated that identifies the first user.

9. A method of communication comprising:
   actuating a first button of a telephone to cause a recorded first name of a first user to be output via a speaker of the telephone, the telephone receiving the recorded first name from a database to output the recorded first name in response to the actuation of the first button, the recorded first name being a recording of the first user saying the first name;
   actuating the first button of the telephone to record a second name being spoken by a second user having that second name; and
   recording that spoken second name spoken by the second user for storage in the database via a microphone of the telephone for storage of that spoken second name with the second user in the database after the actuation of the first button to record the second name being spoken by the second user.

10. The method of claim 9, comprising:
    after actuating the first button, using the telephone to initiate a call to the first user.

11. The method of claim 9, comprising:
    wherein the recording of that spoken second name into the database for storage is performed such that the spoken second name spoken by the second user that is recorded is associated with the second user in the database.

12. The method of claim 9, comprising:
    actuating the first button of the telephone to record the first name being spoken by the first user having the first name;
    recording that spoken first name of the first user into the database for storage of the recorded spoken first name of the first user.

13. The method of claim 9, wherein the first button is actuated to cause the recorded first name of the first user to be output during a conference call to enable the second user to listen to a spoken name of the first user during the conference call.

14. The method of claim 13, wherein the recorded first name of the first user is output via the speaker of the telephone during the conference call.

15. The method of claim 13, wherein the first button is actuated during the conference call to cause a telephone system to which the telephone is connected to play the recorded spoken first name to other conference participants of the conference call.

16. The method of claim 9, comprising:
   actuating the first button of the telephone during a conference call to announce the spoken second name of the second user to the other conference participants already in the conference call.

17. The method of claim 16, wherein the first button is actuated during the conference call to cause the telephone system to play the recorded spoken first name to the other conference participants of the conference call.

18. The method of claim 17, wherein the telephone is connected to a display device that is configured to display indicia associated with the first user.

19. The method of claim 9, comprising:
   displaying indicia identifying the first user via a display device; and
   wherein the actuating of the first button to cause the recorded first name of the first user to be output via the speaker of the telephone occurs while the display device displays the indicia identifying the first user.

20. The method of claim 19, comprising:
   initiating a call with the first user after the recorded first name is output, wherein the call is a telephone call initiated via the telephone.

* * * * *